United States Patent
Grubb et al.

(10) Patent No.: US 7,041,403 B2
(45) Date of Patent: May 9, 2006

(54) FIXED IDC OPERATION OF FUEL CELL POWER PLANT

(75) Inventors: Paul A. Grubb, Somers, CT (US); Paul R. Margiott, South Windsor, CT (US); Sean Haggerty, North Haven, CT (US); Peter A. Golovchenko, Coventry, CT (US); Glenn W. Scheffler, Tolland, CT (US)

(73) Assignee: UTC Fuel Cells, South Windsor, CT (US)

( * ) Notice: Subject to any disclaimer, the term of this patent is extended or adjusted under 35 U.S.C. 154(b) by 0 days.

(21) Appl. No.: 10/373,619

(22) Filed: Feb. 25, 2003

(65) Prior Publication Data

US 2004/0166382 A1 Aug. 26, 2004

(51) Int. Cl.
*H01M 8/04* (2006.01)
(52) U.S. Cl. .......................................... 429/13; 429/23

(58) Field of Classification Search .................. 429/13, 429/22, 23
See application file for complete search history.

(56) References Cited

FOREIGN PATENT DOCUMENTS

JP 7-029585 * 1/1995

* cited by examiner

*Primary Examiner*—Jonathan Crepeau

(57) ABSTRACT

A method for operating a fuel cell power plant to supply power to an internal load and an external load, includes the steps of evaluating power needs of the internal and external loads to determine a fixed IDC value sufficient to supply the needs; providing auxiliary power to the internal load and output power to the external load so as to maintain operation of the fuel cell power plant at the fixed IDC value; and adjusting at least one of the auxiliary power to the internal load and output power to the external load so as to maintain operation of the fuel cell power plant at the fixed IDC value.

7 Claims, 2 Drawing Sheets

FIXED IDC OPERATION OF FUEL CELL POWER PLANT

BACKGROUND OF THE INVENTION

The invention relates to fuel cell power plants and, more particularly, to an improved method for operating same to enhance reliability of the power plant.

Fuel cell power plants are an excellent source of power, and present uniquely desirable alternatives to existing and conventional power sources due to cleaner operation and numerous other well known benefits.

Conventionally, a typical mode of operation for a grid connected fuel cell power plant is to maintain a net AC power output, with attempts to maintain a fixed net power by cycling various control components such as valve actuators, pumps and blowers within the fuel cell power plant to maintain this fixed net power. Typical grid independent power plants operate these control components to adjust process conditions so as to provide the desired power to a fluctuating load.

Unfortunately, this leads to serious reliability and maintenance issues in connection with various fuel cell components such as the aforesaid valve actuators, pumps and blowers, which are subjected to frequent cycling in order to maintain the fixed net power to the main load.

It is clear that the need remains for an improved method for operating fuel cell power plants to resolve these issues.

It is therefore the primary object of the present invention to provide a method whereby fuel cell power plants can be operated with reduced cycling of these components resulting in improved power plant reliability and lower manufacturing and operating costs.

Further objects and advantages of the present invention will appear hereinbelow.

SUMMARY OF THE INVENTION

In accordance with the present invention, the foregoing objects and advantages have been readily attained.

According to the invention, a method is provided for operating a fuel cell power plant to supply main and auxiliary loads, comprising the steps of evaluating power needs of an external load to determine a fixed IDC value sufficient to supply said needs; providing output power to said external load at a level provided by said fuel cell power plant at said fixed IDC value; and adjusting said output power to said external load so as to maintain operation of said fuel cell power plant and said fixed IDC value.

In accordance with a further embodiment of the present invention, a method is provided for operating a fuel cell power plant to supply power to an internal load and an external load, comprising the steps of evaluating power needs of said internal and external loads to determine a fixed TDC value sufficient to supply said needs; providing auxiliary power to said internal load and output power to said external load so as to maintain operation of said fuel cell power plant at said fixed IDC value; and adjusting at least one of said auxiliary power to said internal load and output power to said external load so as to maintain operation of said fuel cell power plant at said fixed IDC value.

In still further accordance with the present invention, a method is provided for operating a fuel cell power plant, which method comprises the steps of evaluating power needs of an external load to determine a fixed IDC value sufficient to supply said needs; and operating said fuel cell power plant at substantially fixed reactant flows sufficient to provide said fixed IDC value.

In still further accordance with the present invention, current provided to main and/or auxiliary loads is modulated, using simplified on/off hardware, so as to further reduce the parts of the system which are subject to wear, and further enhance the ability to operate the fuel cell power plant at constant fuel and oxidant, or reactant, flows.

BRIEF DESCRIPTION OF THE DRAWINGS

A detailed description of preferred embodiments of the present invention follows, with reference to the attached drawings, wherein.

DETAILED DESCRIPTION

Figure 1:
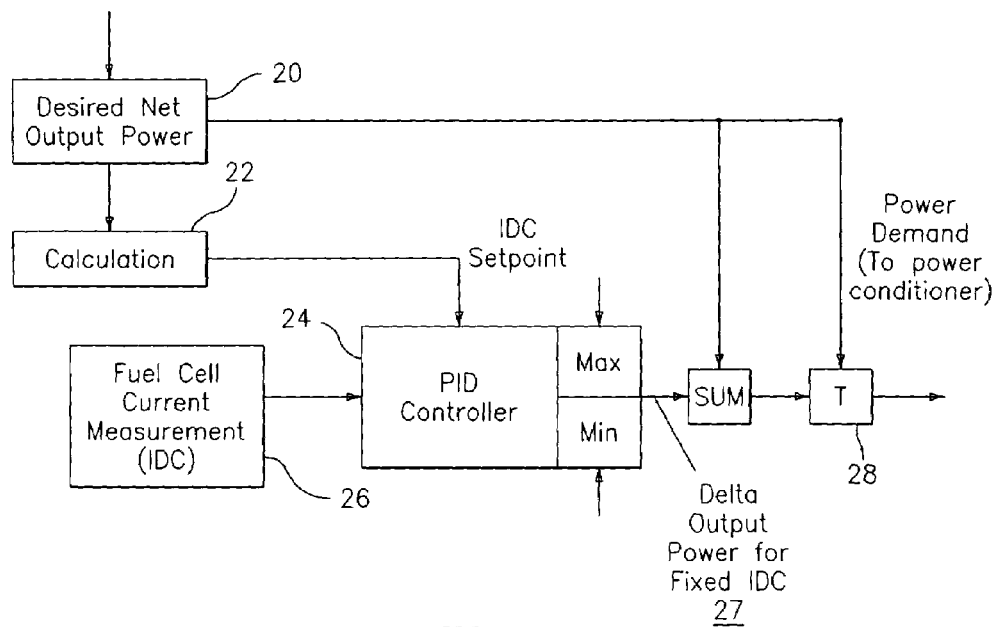
FIG. 1 schematically illustrates a method for operating a fuel cell power plant in accordance with the present invention.

The invention relates to fuel cell power plants and, more particularly, to a method for operating fuel cell power plants and allocating power generated by same so as to operate the fuel cell power plant at fixed DC current (IDC) value, thereby allowing for simplification of hardware requirements of the power plant, and more constant operation of same. Operation at substantially fixed DC current values can advantageously be accomplished utilizing fixed reactant streams or flows to the fuel cell power plant, which can be accomplished utilizing simplified structures which are less prone to failure. This enhances reliability and durability of the power plant.

In accordance with the present invention, and as opposed to conventional operation of fuel cell power plants, the fuel cell power plant is operated at a fixed or constant IDC value which is used to supply a main load. In addition to the main load, auxiliary loads and/or the power grid itself may be present as sources of additional power needs.

In accordance with one embodiment of the present invention, the power requirements of the main load are evaluated along with power requirements of auxiliary loads to determine how much DC current is needed as gross power to meet the main and auxiliary loads. The amount determined to be needed can advantageously be an amount selected to be sufficient to provide power as needed to the auxiliary loads by reducing power provided to the main load and thus should be at least enough to supply maximum needs of the auxiliary loads simultaneously with a minimum requirement of the main load.

After this fixed DC current or setpoint is established, output power to the main load is modified as required to maintain a constant DC current from the fuel cell power plant despite changing conditions such as changing demands from auxiliary loads and the like.

When auxiliary loads may need to be operated at specific times, the required auxiliary power may advantageously be directed to the auxiliary load, and the net power provided to the main load is reduced by comparable amount to provide an adjusted net power to the main load such that the DC current output from the fuel cell power plant still remains substantially constant as desired.

Operation of the fuel cell power plant is thus carried out at a substantially fixed or constant DC current, without requiring modification of operating parameters of the fuel cell power plant. This advantageously avoids the conventionally needed frequent cycling of components of the fuel cell power plant in order to adjust power to supply the demands of the main load. According to the invention, components such as valve actuators, pumps, blowers and the like are operated to provide the fuel cell power plant with steady or constant flows of fuel, oxidant, coolant and the like and so as to produce a substantially constant IDC current with reduced wear on the components. This operation of the fuel cell power plant at fixed reactant flows is a particular advantage of the present invention.

In accordance with another embodiment of the present invention, the main power load is typically a customer or other power-requiring main load, while auxiliary loads can include internal facilities to the fuel cell power plant and the like, operation of which is at least partially optional. In accordance with the present invention, when demands from the main or external load allow, auxiliary power can be used to operate these auxiliary loads, thus operating the auxiliary loads as necessary while assisting in maintaining operation of the fuel cell power plant at constant parameters. In this embodiment, wherein the auxiliary loads can be operated on a flexible schedule, or where power can simply be provided to the grid, operation of the fuel cell power plant at the fixed DC current can be maintained by providing power, beyond the output power required to the main load, to the auxiliary loads and/or grid.

It should be appreciated that the method of the present invention involves either powering an auxiliary load when demands of the main load allow, or reducing power to the main load when auxiliary demands require. Thus, in accordance with the present invention, either main load or auxiliary load drives the ability to use the other. In accordance with a further aspect of the present invention, whichever load is considered controlling is preferably evaluated before changing any operating conditions to be sure that the load, be it main or auxiliary, is within accepted ranges for such load.

In connection with the embodiment of the present invention wherein auxiliary power is allowed when the main load requirements are reduced, it may be desirable for business reasons and numerous other reasons to (a) allow modification of the main load requirements only within a specific band, and (b) feed power to auxiliary loads only when the auxiliary power available is sufficient to operate same.

In accordance with the aspect of the present invention wherein the main power load is reduced by auxiliary power supplied to an auxiliary load when needed, it may further be desirable to allow such reduction in the main power supplied only when acceptable to the customer represented by the main load, and further only when the amount of reduction is within a certain acceptable tolerance.

The various controllers, inverters and like hardware which can be used in order to implement the method of the present invention are well known to a person of ordinary skill in the art, and these specific components do not form any part of the present invention.

Turning now to FIG. 1, a schematic illustration is presented of a system and method for operating same in accordance with the present invention.

FIG. 1 shows a schematic illustration of processing of the demand from the main load in accordance with the present invention. As shown, desired net output power 20 is received and subjected to a calculation 22 whereby an IDC setpoint is determined. This IDC setpoint is then passed to a controller 24, along with information from a fuel cell current measurement 26, for insuring that the IDC setpoint falls within a preset max and min setting for same. Assuming that the IDC setpoint falls within this range, it is considered a valid IDC setpoint, and a delta output power signal 27 is produced which is fed through various components to hardware for controlling net output power to the main load. This delta output power signal advantageously allows for provision of the desired amount of net output power to the main load as desired. In addition, a power control apparatus (not shown) is further operated so as to provide an amount of power corresponding to the difference between gross power produced by the fuel cell power plant and net output power provided to the main load, which remaining power is referred to herein as auxiliary power. This auxiliary power is provided to various auxiliary loads as further described below.

Still referring to FIG. 1, the fuel cell power plant in accordance with the present invention may advantageously have a control system which is operable in two different modes. FIG. 1 shows a first connection between desired net output power 20 and transfer switch 28 which allows for direct provision of desired output power to the customer. In this "normal" method of operation, the fuel cell power plant could be operated conventionally, with potentially frequent cycling of various components so as to maintain net power to the main load at a level corresponding to demand.

FIG. 1 further illustrates the method of the present invention, however, wherein a fuel cell power plant can be operated in a reliability-enhancing mode as described herein, at a fixed IDC value. This mode is represented by the connection through PID controller 24 to determine an amount of excess power which can be fed to auxiliary loads in accordance with the present invention.

Figure 2:
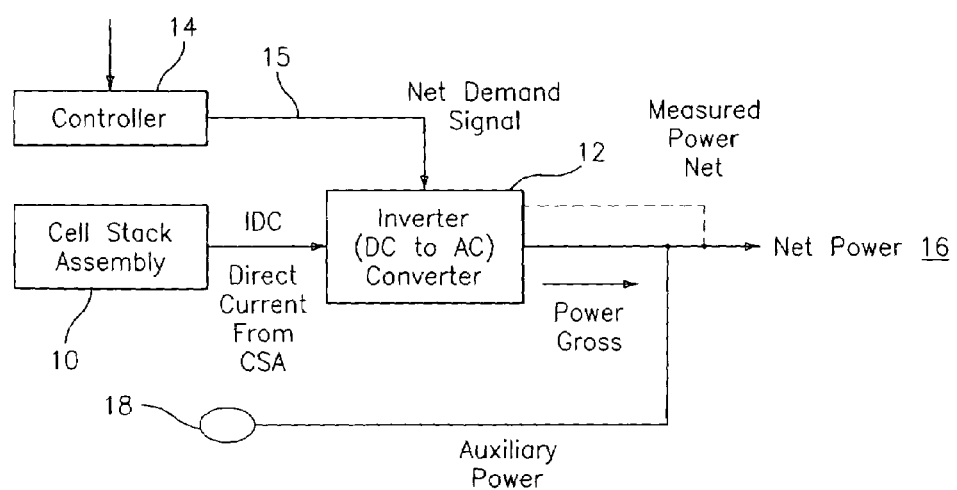
FIG. 2 further schematically illustrates a fuel cell system in accordance with the present invention.

FIG. 2 further illustrates the present invention and shows a fuel cell stack assembly 10 which is advantageously operated at a substantially constant IDC so as to provide a direct current from cell stack assembly 10 to an inverter 12. A controller 14 is provided and adapted to receive communications from a main load as to a net demand. Controller 14 produces a net demand signal 15 which is provided to inverter 12. Inverter 12 in accordance with the present invention produces a gross power, a portion of which is fed to a main load as net output power 16, and a remainder of which is fed to an auxiliary load 18 as auxiliary power. The amount of power fed to the main load as net output power 16 is controlled based upon the net demand signal received by inverter 12.

In accordance with this embodiment of the present invention, auxiliary load 18 may be any available installation, assembly or the like which requires power. For example, the auxiliary load may be internal components of the fuel cell power plant which occasionally require power. Alternatively, auxiliary load 18 may be a power grid, where dumping of power to a power grid is allowed by government municipalities. Of course, other auxiliary loads can be associated with the fuel cell power plant in accordance with the present invention.

As set forth above, in accordance with the present invention, the current output from a fuel cell power plant can advantageously be modulated while fuel and oxidant feeds are advantageously fixed. This further serves to advantageously minimize component cycling such that equipment life is extended and, therefore, power plant reliability is improved.

Figure 3:
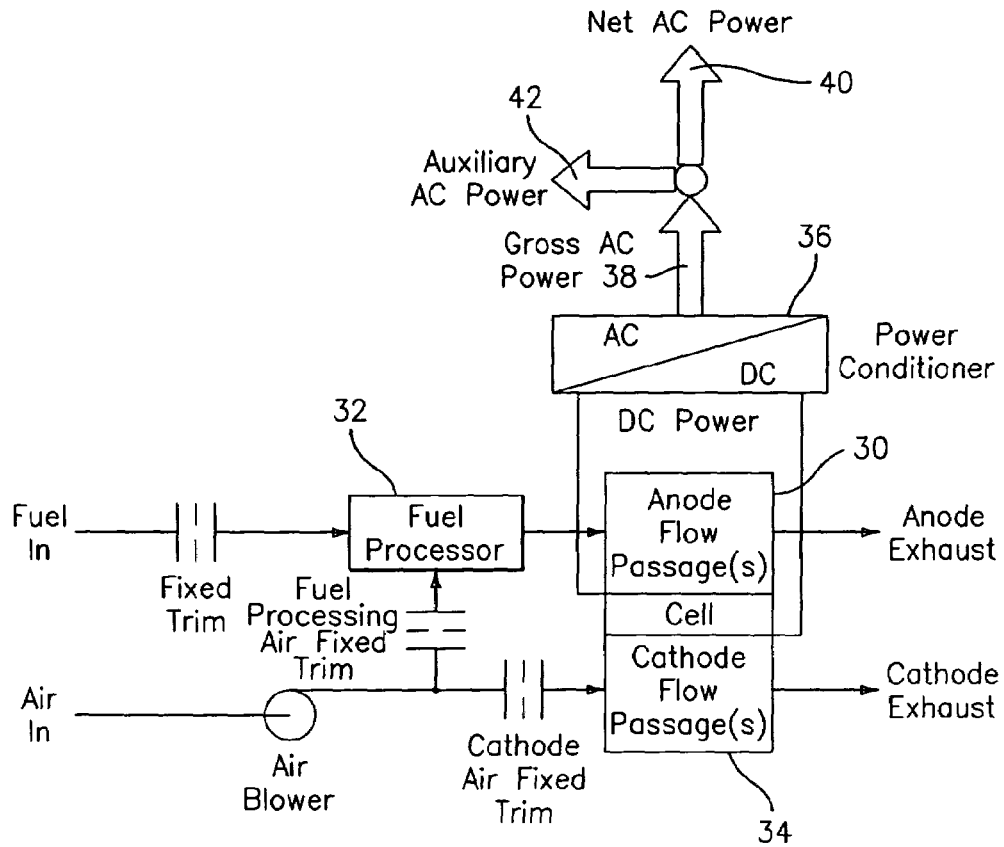
FIG. 3 schematically illustrates a fuel cell system in accordance with the present invention.

FIG. 3 schematically shows a fuel cell system according to the invention and including modulation of fuel and air reactant flows to the fuel cell power plant in accordance with the present invention. As shown, fuel to an anode 30 of the cell is fed at a fixed trim either to a fuel processor 32 if present, or to anode 30. Air is also fed to a cathode 34 at a fixed trim, and can be fed at fixed trim to fuel processor 32 if used, whereby fuel and air are fed at constant rates to the fuel cell. DC power from the cell is fed to a power conditioner 36 to convert to a gross AC power 38, and net AC power 40 is then fed as desired between the main load and/or grid and auxiliary power 42 is fed to other auxiliary loads such as loads inside the power plant and the like.

Figure 4:
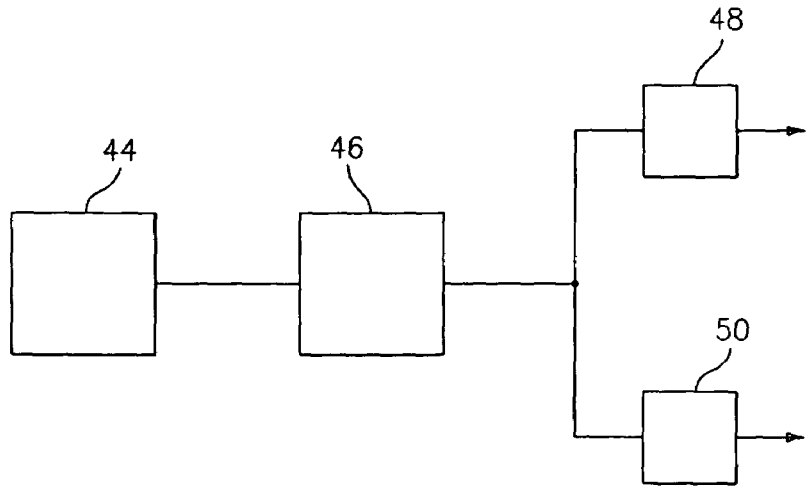
FIG. 4 schematically illustrates connection of a fuel cell system in accordance with the present invention with grid connected and grid independent branches.

FIG. 4 further illustrates an aspect of the present invention wherein a system can be grid connected or grid independent. As shown, a process signal 44 such as flow, temperature and the like is received and passed to setpoint controller 46, which processes the signal and provides the desired IDC to a grid connected branch 48 or grid independent branch 50, depending upon the circumstances. In grid connected branch 48, power not required by the main load can readily be fed to the grid and/or other internal auxiliary loads, as desired.

In the grid independent branch 50, however, excess power not required by the main load must be fed to internal auxiliary loads such as heaters and the like. In either branch, all power generated by the fixed IDC from the fuel cell power plant is utilized such that cycling of fuel cell power plant components is not required.

In accordance with the present invention, it should readily be appreciated that an improved method for operating a fuel cell power plant is provided wherein the fuel cell power plant is operated at a fixed IDC, with balancing of power fed to a main load and auxiliary load or loads such that total power produced from the fuel cell power plant is consumed, thereby allowing steady operation of the fuel cell power plant, which enhances reliability and durability of same.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed:

1. A method for operating a fuel cell power plant to supply power to an internal load and an external load, comprising the steps of:
   evaluating power needs of said internal and external loads to determine a fixed IDC value sufficient to supply said needs;
   operating said fuel cell power plant to provide said fixed IDC value;
   providing auxiliary power to said internal load and output power to said external load so as to maintain operation of said fuel cell power plant at said fixed IDC value; and
   adjusting at least one of said auxiliary power to said internal load and output power to said external load so as to maintain operation of said fuel cell power plant at said fixed IDC value, wherein the internal load has a maximum power requirement and the external load has a minimum power requirement, and wherein the evaluating step comprises setting said fixed IDC value sufficient to supply both said maximum power requirement of said internal load and said minimum power requirement of said external load.

2. The method of claim 1, wherein said adjusting step comprises adjusting said auxiliary power to said internal load so as to maintain operation of said fuel cell power plant at said fixed IDC value.

3. The method of claim 1, wherein said fuel cell power plant has a normal operating mode wherein said adjusting step cannot be carried out and a reliability enhanced operating mode wherein said adjusting step can be carried out.

4. A method for operating a fuel cell power plant, comprising the steps of:
   evaluating power needs of an external load to determine a fixed IDC value sufficient to supply said needs; and
   operating said fuel cell power plant at substantially fixed reactant flows sufficient to provide said fixed IDC value, wherein said evaluating step comprises evaluating combined power needs of an internal load and said external load to determine said fixed IDC value sufficient to supply said needs and further comprising determining a range of IDC values which can be provided at said substantially fixed reactant flows, and adjusting said fixed IDC value within said range of IDC values.

5. The method of claim 4, wherein said adjusting step comprises adjusting at least one of auxiliary power to said internal load and output power to said external load.

6. A method for operating a fuel cell power plant to supply power to an internal load and an external load, comprising the steps of:
   evaluating power needs of said internal load and said external load to determine a fixed IDC value sufficient to supply said needs;
   operating said fuel cell power plant at substantially fixed reactant flows sufficient to provide said fixed IDC value; and
   adjusting power to at least one of said internal load and said external load so as to maintain said fixed IDC value and said fixed reactant flows, wherein the internal load has a maximum power requirement and the external load has a minimum power requirement, and wherein the evaluating step comprises setting said fixed IDC value sufficient to supply both said maximum power requirement of said internal load and said minimum power requirement of said external load.

7. The method of claim 6, wherein said adjusting step comprises adjusting at least one of auxiliary power to said internal load and output power to said external load.

* * * * *